US005177516A

United States Patent [19]

Fitz et al.

[11] Patent Number: 5,177,516

[45] Date of Patent: Jan. 5, 1993

[54] CAMERA CRANE

[75] Inventors: Erich Fitz, Vagen; Klaus Resch, Munich, both of Fed. Rep. of Germany

[73] Assignee: Panther GmbH Herstellung, Vertrieb und Verleih Filmtechnischer Gerate, Oberhaching, Fed. Rep. of Germany

[21] Appl. No.: 769,729

[22] Filed: Oct. 2, 1991

[30] Foreign Application Priority Data

Oct. 2, 1990 [DE] Fed. Rep. of Germany ....... 4031106

[51] Int. Cl.[5] .............................................. G03B 29/00

[52] U.S. Cl. ...................................... 354/81; 352/243; 248/123.1

[58] Field of Search .................. 354/81, 293; 352/243; 248/123.1; 108/144

[56] References Cited

U.S. PATENT DOCUMENTS 2,447,667 8/1948 Roby .............................. 352/243 X 4,849,778 7/1989 Samuelson ........................... 354/81

*Primary Examiner*—Richard A. Wintercorn

*Assistant Examiner*—Howard B. Blankenship

*Attorney, Agent, or Firm*—Jacobson, Price, Holman & Stern

[57] ABSTRACT

A camera crane has a two-arm boom supported in swivel fashion by a support column whose height can be adjusted. Swivel-mounted to the first arm is a platform for a camera and, if so desired, a seat for a cameraman, and swivel-mounted to the second arm is a cage to receive balance weights. A parallel-guide apparatus provides for the parallel guidance of the platform and the cage when the boom is rotated. In order to provide a greater hoist area, the boom—whose first arm of length "a" supporting the platform in standard operation is longer than the second arm of length "b" supporting the cage in standard operation—is provided with an extension piece of length "c" serving to lengthen the second arm. The cage can be replaced at the end of the second boom arm, lengthened with the extension piece, by the platform, and the cage can be attached in place of the platform at the end of the first boom arm. The length-specific ratio a: (b+c) of the lengthened boom is approximately equal to the length-specific ratio b:a of the boom in the standard length.

5 Claims, 1 Drawing Sheet

CAMERA CRANE

BACKGROUND OF THE INVENTION

This invention relates to a camera crane with a two-arm boom swivel-mounted on a support column, whose height can be adjusted if so desired. The first arm has a platform swivel-mounted to receive a camera and, if so desired, a seat for a camera-man and the second arm has a cage swivel-mounted to receive balance weights. A parallel-guide apparatus serves to guide the platform and cage in parallel fashion when the boom is swung out, the parallel-guide apparatus comprising a first control arm running diagonal to the swivel axis of the platform and projecting from the platform, with a first connecting point; a second control arm running diagonal to the swivel axis of the cage and projecting from said cage, with a second connecting point; a guide arm running diagonal to the swivel axis of the boom and projecting from the support column, with a guide connecting point; a first guide rod running between the guide connecting point and the first connecting point, and a second guide rod running between the guide connecting point and the second connecting point.

With camera cranes of this type, the boom arm to which the platform is linked is longer than the boom arm supporting the cage. In selecting cage weights to equalize the weight bearing upon the boom on its platform side, attention must be given to the fact that a correspondingly higher cage weight exerts a torque on the guide arm, by way of the second control arm and the second guide rod, that is greater than the torque exerted on the guide arm by the platform carrying the camera and the camera-man by way of the first control arm and the first guide rod. The practical demand for lengthening the boom arm on the platform side in certain applications cannot be fulfilled without further consideration. This extension would require an increased weight load on the cage, in keeping with the shorter boom arm on the cage side. The torque exerted by the cage on the guide arm by way of the second guide rod, however, can reach an inadmissibly high value relative to that of the torque working against it on the platform side. In actual practice, to safely lengthen the boom arm on the platform side therefore requires that the boom arm on the cage side be correspondingly lengthened. However, the measures necessary to extend the boom arms and thereby to increase the hoist of the camera platform are extremely involved and time-consuming.

SUMMARY OF THE INVENTION

An object of the invention, therefore, is to provide a camera crane of the above type in which when the need arises and with relatively slight assembly expense, it is possible to lengthen the boom arm supporting the platform and with relative ease and speed to thereby increase the lift of the camera platform.

According to the invention, the boom has a first arm of length "a" supporting the platform in standard operation which is longer than a second arm of the boom of length "b" supporting the cage. An extension piece is provided serving to lengthen the second arm, along with a guide rod piece, both of a length "c". The cage can be replaced with the platform at the end of the second boom arm (lengthened by meas of the extension piece) and the cage, rather than the platform, can be attached to the end of the first boom arm. The length-specific ratio a:(b+c) of the lengthened boom is approximately equal to the length-specific ratio b:a of the boom in standard length.

In this camera crane configuration, all that is required to considerably increase the hoist is to extend the length of the boom arm and to reverse the platform and cage, and this without danger that any new distribution of weights might result in an improper load on the cage relative to the platform weight, with consequent damage to the boom and injury to personnel. The weight relationships determinant for the torque exerted on the guide arm of the support column can remain fully unchanged due to the length c selected for the extension piece, said length c guaranteeing the demanded length-specific ratio of $c=(a_2-b_2):b$.

It is of particular structural advantage for the boom to have a central boom segment, which comprises a swivel mount, positioned toward one of the boom ends, for swivel attachment to the support column, and for the two ends of the central boom segment to be furnished with equivalent mounting devices for the attachment of matchingly designed retainer plate supports; and for the extension piece to exhibit at one end a counter device for attachment of the mounting device to the central boom segment, while supporting at its other end a mounting device which agrees with the mounting devices on the ends of the central boom segment.

A further feature of the invention provides the crane with a movable mount for the boom support column. With a view to a particularly simple, materially efficient, and thus cost-beneficial design, it is advantageous for the mount to have a base with an upper collar surrounding and attachable to the support column, a lower collar with four recesses for the separable attachment of railed wheels, each of which can turn around the vertical axis of the recess, and four support struts running directly from the upper collar to the lower collar in the area of the recesses. When a base of this type is employed, the support column carrying the boom can be positioned on a dolly by means of the base and the design of the dolly can be simpler than that of conventional camera cars. The particularly large weights transferred by the loaded boom to the support column do not, as was formerly the case, need to be transferred by the support column to a virtually horizontal camera car platform, to each of whose outer corners is attached a path-rail wheel unit, as known to the prior art. Instead they can be diverted directly to the outer corner areas by means of support struts; the central platform area is not subject to a load, thereby promoting material economy and easy implementation. Particularly favorable in this case is the ability to attach railed wheels to the base itself in the area of the recesses. In this case the camera is dispensable, since the base assumes its function.

Each of the four recesses will expediently comprise a vertical bore into which a support pin, with a support shoulder to provide a contact surface with the bore rim, can be inserted from below, while each support pin can be connected with the swivel pin projecting from the bearing of a railed wheel pair.

Further details, advantages, and features of the invention will emerge from the following description as based on the attached drawing, to which express reference is made for all essential features not mentioned in this description.

DESCRIPTION OF PREFERRED EMBODIMENTS

Figure 1:
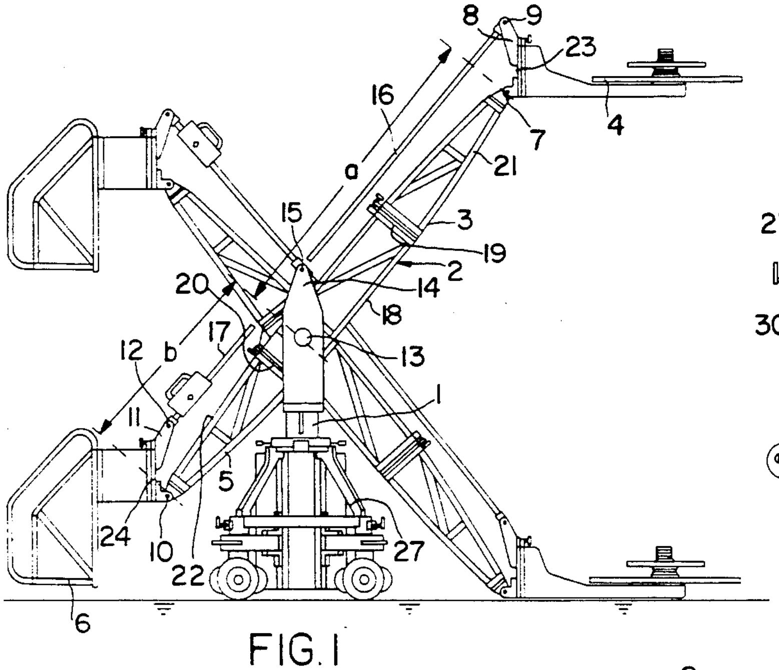
FIG. 1 is an elevational view of a camera crane in standard length without an extension.
Figure 3:
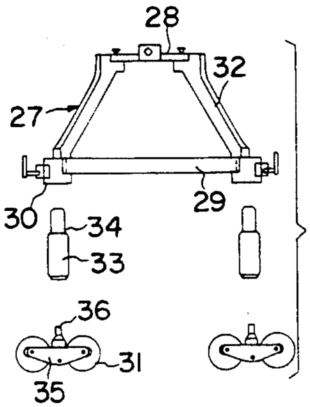
FIG. 3 is an exploded view of a base assigned to the camera crane support column.

The camera crane shown in the drawing comprises a two-arm boom 2 which swings from a support column 1, whose height may be adjusted, if so desired. In the standard embodiment of the camera crane shown in FIG. 1, a platform 4 to receive a camera and, if so desired, a seat for the camera-man is connected to the first arm of the two-arm boom 2; while on the second arm 5 a cage 6 is swivel-mounted to receive balance weights. Assigned to the two-arm boom 2 is a parallel-guide apparatus serving to guide the platform and cage in parallel fashion when the boom rotates; the apparatus comprises an initial control arm 8 which runs diagonal to the swivel axis 7 of the platform 4 and projects from said platform 4, with an initial connecting point 9, and a second control arm 11 which runs diagonal to the swivel axis 10 of the cage 6 and projects from said cage 6, with a second connecting point 12. The parallel-guide apparatus also comprises a guide arm 14 that runs diagonal to the swivel axis 13 of the boom 2 and projects from the support column and that exhibits a guide connecting point 15. A first guide rod 16 runs between the guide connecting point 15 and the first connecting point 9. A second guide rod 17 is provided in analogous form between the guide connecting point 15 and the second connecting point 12.

As shown in FIG. 1, the first arm 3 of the boom 2 carrying the platform 4 has an effective length "a" that is greater than the length "b" of the second arm 5 which carries the cage 6 in standard operation. In the embodiment of FIG. 1, this difference in arm length is due to the fact that the boom 2 has a central boom segment 18, whose swivel mount 13 to the central column 1 is displaced toward its lower end. The two ends 19 and 2 of segment 18 have identically designed mounting devices, which are known in the prior art, for the connection of identical retaining plate support components 21, 22. FIG. 1 shows that the retaining plates 23 and 24, which are attached in either case to support components 21, 22 and which swing around swivel axes 7 and 10, are of identical design. By means of rapid coupler devices known in the prior art and not shown in detail, either a platform 4 or a cage 6 can be attached to these retaining plates 23 and 24.

In an equally simple manner the retainer plate supports 21 and 22 can be separably attached to the mounting devices of the two ends 19, 20 of the central boom segment 18.

Figure 2:
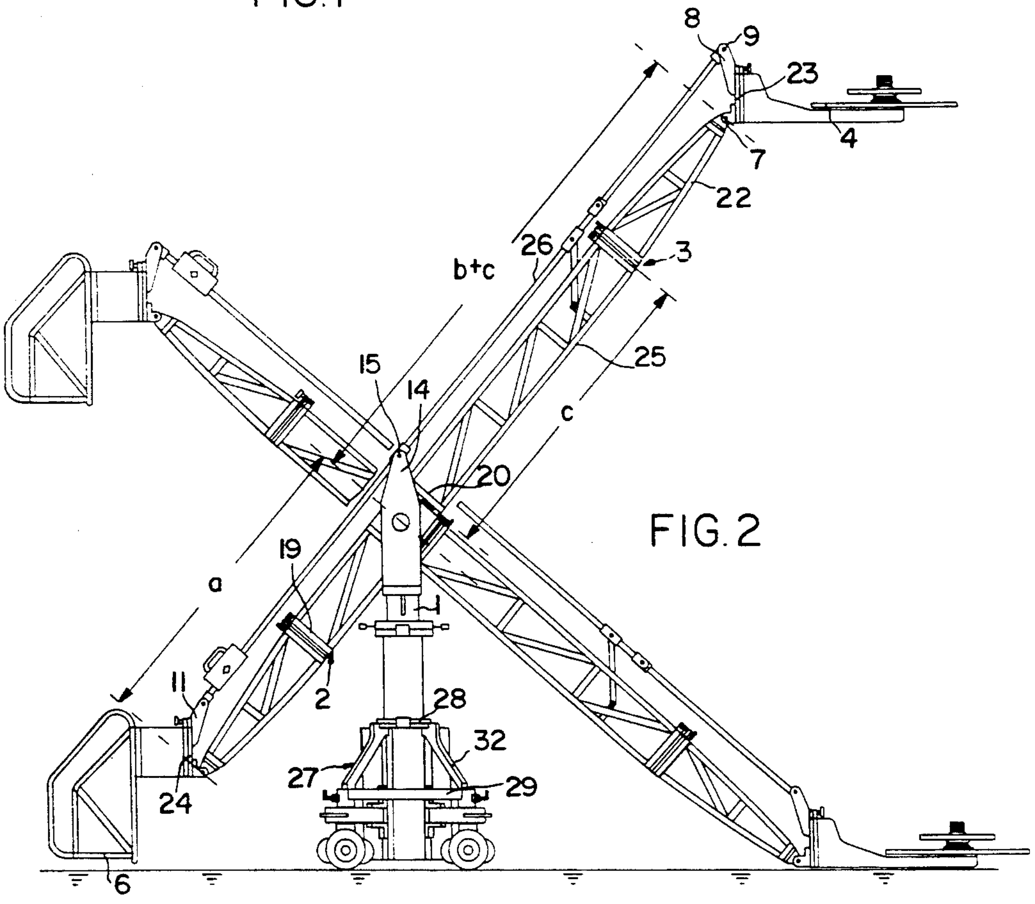
FIG. 2 is a view of the camera crane fitted with an extension.

In order to extend the reach and working height of the camera crane, the boom 2 can be elongated by adding an extension piece 25 of length "c", as shown in FIG. 2. This extension piece 25 is attached in place of the retainer plate support 22 to the end 20 of the central boom segment 18 which is adjacent to the swivel mount 13. At its free end, the extension piece 25 exhibits a counter-device that permits attachment to the mounting device of the central boom segment 18. At its other end the extension piece 25 is equipped with a mounting device that agree with the known mounting device at the ends 19 and 20 of the central boom segment 18.

As shown in FIGS. 1 and 2, the length "c" of the extension piece 25 is such that, together with retainer plate support 22 adjacent to the said extension piece, it yields a length of b+c, which corresponds, in relation to the length "a" of the other boom arm, to the ratio "a" of the longer boom arm in the standard embodiment according to FIG. 1 to length "b" of the shorter boom arm 5 of this same embodiment. In changing over from the standard embodiment of FIG. 1 to the elongated embodiment of FIG. 2, all that is necessary is to reverse the platform 4 and the cage 6 relative to center segment 18 (reverse the center segment in relation to its FIG. 1 position), without having to change the balances in cage 6 because of the elongation. Naturally the insertion of the extension piece 25 requires that the guide rod of the parallel-guide apparatus be extended, namely through the addition of a guide rod piece 26, whose length corresponds to the length of the extension piece 25.

As can be seen in FIGS. 1 and 2, the camera crane comprises a movable mount for the boom support column. The main feature of this mount is a base 27 with a central upper collar 28 which surrounds and can be attached to the support column 1; a lower collar 29 with four recesses 30 for the separable attachment of railed wheels 31, each of which can turn around the vertical axis of the recess; and four support struts 32 running directly from the upper collar 28 to the lower collar 29 in the area of the recesses. Each of the four recesses 30 exhibits a vertical bore into which a support pin 33, with a support shoulder 34 to provide a contact surface with the bore rim, can be inserted from below. Each of the support pins 33 can be connected with the swivel pin 3 projecting from the bearing 35 of a railed wheel pair.

While only one boom has been described in detail, it is evident that the crane has two such booms on a common support.

What is claimed:

1. Camera crane with a two-arm boom swivel-mounted on a support column, the boom having a first arm to which a platform is swivel-mounted to receive a camera and a second arm to which a cage is swivel-mounted to receive balance weights and with a parallel-guide apparatus serving to guide the platform and cage in parallel when the boom is swung out, said parallel-guide apparatus comprising a first control arm running diagonal to a swivel axis of the platform and projecting from said platform, with a first connecting point, a second control arm running diagonal to a swivel axis of the cage and projecting from said cage, with a second connecting point, and a guide arm running diagonal to a swivel axis of the boom and projecting from the support column, with a guide connecting point, a first guide rod running between the guide connecting point and the first connecting point, and a second guide rod running between the guide connecting point and the second connecting point, an extension piece serving to lengthen the second arm, along with a guide rod extension piece, each of a length "c", the first arm which in standard operation supports the platform having a length "a" and being longer than the second arm which is of length "b", and which in standard operation supports the cage, and at the end of the second boom arm when lengthened by the extension piece, the cage can be replaced by the platform and the cage can be attached to the end of the first boom arm in place of the platform, and wherein the length-ratio a:(b+c) of the boom arms when the second arm is lengthened is approximately equal to the length ratio b:a in standard operation of the boom.

2. Camera crane of claim 1, wherein the boom has a central boom segment which comprises a swivel mount displaced toward one of its ends for swivel attachment to the support column, and having ends provided with mounting devices of equivalent design for the attachment of retainer plate supports of matching design, and wherein the extension piece has at one end a counter-device that permits the attachment of a selected mounting device of the central boom segment and, at the other end of the extension piece is a mounting device which conforms with the mounting devices on the ends of the central boom segment.

3. Camera crane of claim 1 having a movable mount for the support column, wherein the mount comprises a base with an upper collar surrounding and attachable to the support column, a lower collar with four recesses for separable attachment of railed wheels, each of which can turn around the vertical axis of the recess, and four support struts extending from the upper collar to the lower collar in the area of the recesses.

4. Camera crane of claim 3, wherein the four recesses each have a vertical bore into which a support pin, with a support shoulder to provide a contact surface with the bore rim, can be inserted from below, and each support pin can be connected with the swivel pin projecting from the bearing of a railed wheel pair.

5. A camera crane having an elongate central boom segment pivotally connected to a support column at a swivel connection, the central boom segment being mounted to the support column asymmetrically with respect to its length to provide shorter and longer portions, a first boom end segment carrying a pivotally connected mount for a camera, the first boom end segment being selectively attachable to the respective portions of the central boom segment, a second boom end segment carrying a pivotally connected balance weight cage, the second boom end segment being selectively attachable to the respective portions of the central boom segment opposite the first boom end segment, parallel guide apparatus for maintaining horizontal parallelism of the mount and cage during pivotal movements of the boom including respective guide rods pivotally connectable between the mount and the support column and between the cage and the support column, a boom extension segment selectively insertable between one of said portions of the central boom segment and one of the boom end segments, and corresponding extension means for one of said guide rods, the crane having a standard configuration absent said extension segment and extension means wherein the first boom end segment is connected at one end to the longer portion of the central boom segment and the second boom end segment is connected at one end to the shorter boom segment, the boom in said first configuration having a first boom arm of length "a" carrying the mount and a second boom arm of length "b" (shorter than length "a") carrying the cage, the crane having an extended configuration wherein the extension segment is connected between the shorter portion of the central boom segment and the first boom end segment, and the second boom end segment is connected to the longer portion of the central boom segment, the boom in said extended configuration having a third boom arm of a length "b+c" carrying the seat ("c" being the length of said extension) and a fourth boom arm of length "a" carrying the cage and wherein the guide rod for the third boom arm is extended by said extension means.

* * * * *